United States Patent [19]
Pond

[11] Patent Number: 5,860,056
[45] Date of Patent: Jan. 12, 1999

[54] SATELLITE INFORMATION UPDATE SYSTEM

[75] Inventor: Russell Lee Pond, Euless, Tex.

[73] Assignee: Uniden America Corporation, Fort Worth, Tex.

[21] Appl. No.: 374,841

[22] Filed: Jan. 19, 1995

[51] Int. Cl.[6] .................................................. H04B 7/185
[52] U.S. Cl. .......................................... 455/13.3; 342/359
[58] Field of Search ............................ 342/359; 343/766; 455/3.2, 9, 11.1, 12.1, 13.3, 20, 25, 67.1, 68, 70, 226.1, 231, 427

[56] References Cited

U.S. PATENT DOCUMENTS

| | | | |
|---|---|---|---|
| 4,287,597 | 9/1981 | Paynter et al. ............................. | 455/12 |
| 4,783,848 | 11/1988 | Ma et al. ................................... | 455/182 |
| 4,888,592 | 12/1989 | Paik et al. ................................. | 342/359 |
| 5,077,560 | 12/1991 | Horton et al. ............................. | 342/359 |
| 5,313,215 | 5/1994 | Walker et al. ........................... | 455/12.1 |

*Primary Examiner*—Nguyen Vo
*Attorney, Agent, or Firm*—Daniel R. Brown

[57] ABSTRACT

A method and apparatus for utilizing satellite update information are disclosed. In the preferred embodiment satellite update information, comprising satellite position, polarity, name, and abbreviation, are accumulated at a first location and transmitted via satellite to at least one of a plurality of satellite receivers. The satellite receiver is operable to receive and automatically utilize the satellite update information such that the end user of the satellite receiver in unaware of the automated process of updating satellite information in the satellite receiver. The satellite receiver uses a portion of the satellite update information to calculate a pulse count for positioning an antenna to receive radio signals from a satellite for which satellite update information has been received.

1 Claim, 6 Drawing Sheets

| REC.# | TYPE | NAME | ABRV. | LON. | POL. | BAND |
|---|---|---|---|---|---|---|
| 1 | A | GALAXY-4 | G4 | 0990 | I | C |
| 402 | 404 | 406 | 408 | 410 | 412 | 414 |

| ITEM | DESCRIPTION | BYTES |
|---|---|---|
| 402 — REC.# | RECORD NUMBER | 1 |
| 404 — TYPE | RECORD TYPE, ADD, DELETE, UPDATE | 1 |
| 406 — NAME | SATELLITE NAME | 20 |
| 408 — ABRV. | SATELLITE ABBREVIATION, 2-CHARACTERS | 2 |
| 410 — LON. | SATELLITE LONGITUDE, WEST | 4 |
| 412 — POL. | POLARITY, NORMAL OR INVERSE | 1 |
| 414 — BAND | RADIO FREQUENCY BAND | 1 |

SATELLITE INFORMATION UPDATE SYSTEM

TECHNICAL FIELD OF THE INVENTION

This invention pertains to satellite systems. In one embodiment, a method of transferring satellite update information to satellite receivers which are adapted to utilize such information is disclosed.

BACKGROUND OF THE INVENTION

Satellite broadcast systems have been in operation for many years. In a typical system, an uplink site transmits a radio signal to a satellite which receives the radio signal and then retransmits the radio signal towards Earth. The retransmitted radio signal is received at a downlink site, thereby completing the satellite radio broadcast transmission.

The antennas used at both the uplink and downlink sites utilize very high signal gain and narrow directivity due to the long transmission distances and the relatively low transmission powers involved in such systems. The directivity of these antennas also provide for selectivity between satellites which are operating at or near the same frequency band and which are spaced relatively near one another.

The aforementioned radio signals are typically modulated with information. Audio, video, and data information are commonly transmitted. Often times a given satellite receives and transmits one or more of these three types of information simultaneously.

Satellites are classified by the altitude at which they orbit Earth. Correspondingly, the altitude at which a satellite orbits determines the period of its orbit around Earth. A certain class of satellites, which are stationed at an altitude above earth such that the satellite's period of orbit is equal to the earth's orbital period and which are located at a zenith with respect to a point along the Earth's equator, are called geosynchronous orbit satellites. Or, geosynchronous satellites. Geosynchronous satellites are advantageous because they appear to be stationary from earth and they allow a downlink site with a fixed position antenna to continuously receive radio signals without a need to track any relative movement between the satellite and Earth.

International agreement and United States federal law have provided for the operation of a plurality of geosynchronous satellites which receive and rebroadcast television receive-only (TVRO) signals. These satellites operate in the C and Ku frequency bands. The C-band operates at uplink frequencies in the 6 GHz range and downlink frequencies in the 4 GHz range, the Ku-band operates at uplink frequencies in the 14 GHz frequency range and downlink frequencies in the 12 GHz range. In some types of satellite systems, other frequency bands may be used. End users who operate TVRO downlink sites are enabled to receive TVRO signals.

Each of the C-band and Ku-band TVRO satellites employ several transponders, usually twenty-four in C-band and 32 in Ku-band, that each have a given operational bandwidth, usually 36 MHz. In operation, each of the transponders can be viewed as a separate satellite radio channel. The frequencies of operation of each of the transponders are distinct from others on a given satellite, however, the range of frequencies covered by all the transponders in any given geosynchronous satellite are usually contiguous. In order to improve the isolation of adjacent transponder signals in a given satellite, satellite designers employ the use of orthogonal signal field polarity between transponders that are adjacent in frequency. An arbitrary use of the horizontal and vertical electric signal field polarity descriptors used in terrestrial radio systems is used in satellite systems. Therefore, every-other transponder in most geosynchronous satellites has a vertical electric field polarity and the alternate every-other transponder has a horizontal electric field polarity, the two polarities being orthogonal to one another. This scheme is typically used in C-band satellites and sometimes used in Ku-band satellites. Ku-band satellites do not necessarily alternate between the vertical and horizontal polarities. However, other polarization formats may be used, circular polarization for example.

In a further use of signal isolation through polarity management, separate satellites that are adjacent to one another in orbit are sometimes given opposite polarities with respect to each transponder starting with the first, or the number one, transponder. Thus, if the first transponder in a given satellite has a vertical polarity, then that satellite is said to have a normal polarity. Alternatively, if the first transponder in a given satellite has horizontal polarity, then that satellite is said to have an inverse polarity.

By definition, all geosynchronous satellites orbit directly above the equator and therefore, each satellite's location can be defined by its position in degrees of longitude. Satellites useful for broadcast to the continental United States and other territories are located from about 69 degrees west to 139 degrees west longitude.

As a practical matter, satellites do not stay at a precise location, but rather tend to drift slightly in their relative position with respect to each and the earth. Further, satellites have a finite life span and need to be decommissioned and replaced from time to time. Also, new satellites are occasionally added to the geosynchronous orbit so that total channel capacity can be increased. Also, sometimes a satellite is decommissioned without being replaced. Sometimes, a replacement satellite will have the same characteristics as the satellite it replaces. Other times, the replacement satellite may be located at a different angle of longitude or have the opposite polarity of the satellite it replaced.

In order for a TVRO satellite receiver to properly receive satellite signals, it must have information about the position of the satellite, the polarity of the satellite, and the frequency of operation of the satellite. Further, in order for the selection of satellite signals and programming choices to be convenient and useful to an end user, the satellites are given names and abbreviations so that program guides, user interfaces displays and in other instances, the particular satellites can be identified.

When a TVRO satellite receiver is initially installed at an end user's downlink site, a service technician, who is skilled in things related to satellite downlink sites and receivers, usually installs the equipment and programs a memory in the satellite receiver with the satellite information for the various satellites from which signals are to be received. However, as changes occur in the satellite information for the reasons described above, it is necessary to provide satellite update information to the satellite receiver in order to keep the satellite memory programmed with current satellite information so that the end user can receive all desired satellite radio signals.

The loading of satellite update information into a memory in the satellite receiver poses a problem to the end user. First the end user must make himself aware of the need to add satellite update information, then the user must manually program such satellite update information into the memory of the satellite receiver. Clearly there is a need to streamline and automate the process of maintaining and entering satellite update information into a satellite receiver.

SUMMARY OF THE INVENTION

The present invention overcomes problems associated with gathering, transferring, updating, storing and utilizing satellite update information in satellite receivers.

Satellite update information is entered into a first memory from time to time as the satellite update information changes, thereby maintaining a complete satellite information database which has been updated by the periodic entry of satellite update information. This database of information can be stored at a single location. The database of satellite information, including satellite update information, is coupled to a satellite uplink site which comprises a satellite uplink transmitter. A controller at the satellite uplink site modulates at least a portion of the satellite information database including satellite update information onto the satellite uplink transmitter radio signal. The uplink radio signal is transmitted to a satellite.

In its due course of operation, the satellite retransmits the satellite radio signal back to earth. At least one of a plurality of satellite downlink sites receives the satellite radio signal which has been modulated with satellite update information. A satellite receiver, which is a part of the satellite downlink site, receives the satellite radio signal and demodulates and processes the satellite update information. The received, demodulated, and processed satellite update information is stored in a second memory in the satellite receiver.

The coordination of when the uplink site transmits satellite update information and when the satellite downlink site has been configured to receive satellite update information can be managed in several ways. Firstly, the satellite uplink site can transmit the satellite update information continuously. This method allows for satellite receivers to be configured to receive satellite update information at any time, because it is known that the satellite update information will be available for reception continuously.

Alternatively to continual transmission of satellite update information, the satellite uplink site can transmit satellite update information at a pre-determined time. Also, the predetermined time can be periodic, every day for example. By utilizing a clock in a satellite receiver, the satellite receiver can be configured to receive satellite update information at the above mentioned pre-determined time. That is to say that the reception of satellite update information is in synchronous with the transmission.

In another aspect of coordinating the reception of satellite update information, more than one satellite may be utilized for transmission of satellite update information. This is accomplished by employing a satellite uplink site that is capable of transmitting to two different satellites simultaneously or employing two different satellite uplink sites transmitting the same satellite update information. The benefit of such an arrangement is that one of the satellites retransmitting satellite update information can be changed or deleted while one of the other satellites which retransmits satellite update information can broadcast satellite update information about the other. This form of redundancy is useful especially if the satellite receivers which receive satellite update information are programmed with information about those satellites that carry satellite update information.

It is also useful for the satellite update information to have a data portion that contains information about which satellites carry satellite update information and when such information is transmitted.

In any case, the satellite receiver receives and demodulates the satellite update information and subsequently stores the satellite update information in a second memory. Satellite update information can be identified as new information, update information, and/or delete information. In the case of all of these types of information, the satellite receiver uses the information to automatically modify a satellite information database within a third memory that is in the satellite receiver. The automatic modification of information in the satellite information database in accordance with the received satellite update information essentially eliminates the need for the end user of the satellite receiver to control the use of satellite update information. Rather, the satellite receiver employs a controller to manage the use of satellite update information for the benefit of the end user.

The satellite update information comprises information that defines the location of each satellite, the polarity of each satellite, and the frequency band of operation of each satellite, in addition to other information. This information allows the satellite receiver to configure itself to receive radio signals from each of the satellites for which satellite update information is provided.

It is well known that geosynchronous satellite downlink sites comprise a satellite receiver in addition to an antenna system which may be steerable by the satellite receiver, or alternatively, there may be a separate external antenna actuator circuit which is coupled between the satellite receiver and the antenna. In a typical installation, the antenna system comprises an actuator arm whose length is adjustably controllable by an antenna drive circuit in the satellite receiver. The actuator arm is typically pivotally mounted to the antenna system such that actuation of the actuator arm, by the satellite receiver, causes the antenna to be directed to a specific satellite. The antenna drive circuit actually supplies electrical energy to the actuator which is supplied such that the actuator arm can be extended or retracted, causing the antenna to be steered in opposite directions. As the antenna moves, a sensor in the antenna sends pulses of electric current back to the satellite receiver, thereby confirming the motion of the antenna. The accumulation of many of these pulsed increments indicates the overall travel of the antenna position across the required arc to receive the desired satellite radio signals, which may comprise satellite update information. Furthermore, satellite receivers typically monitor the actual position of the antenna by counting the pulses for which the antenna has been incrementally moved. This system provides for feedback as to the actual antenna movement and position.

In the present invention, the position of each satellite, which is specified in terms of its longitude, is represented in the third memory as a pulse count that is relative to the pulse count of another satellite in the memory. This pulse count may alternatively be called an antenna position determining value. The information needed is merely information to determine the antenna position, and the present invention does not necessarily require the use of a pulse count. The satellite receiver in the present invention calculates the pulse count for each satellite, for which satellite update information is received, according to an algorithm that uses the pulse counts of two known satellites and the longitudes of the same two known satellites and the longitude of the satellite for which the calculations are being computed. The newly calculated pulse count is stored in a memory in the satellite receiver and is used to initially position the antenna. The calculation of the pulse count of a satellite for which satellite update information has been received is automated in the present invention so that the end user need not be concerned with the utilization of satellite update information. The newly calculated pulse count may be subsequently adjusted by the satellite receiver in order to optimize signal reception. In this situation, the satellite receiver incrementally adjusts the position of the antenna and monitors the quality of the received signal. By using such a technique, the satellite receiver can determine the pulse count necessary to achieve the best available signal. However, the satellite receiver can only use this technique in the situation where the initially calculated pulse count is accurate to the extent required to receive at least a minimally adequate received satellite signal.

Another aspect of the use of satellite update information is the naming and abbreviations of satellites. For user convenience and other purposes, satellites are given names and abbreviations so that particular channels on particular satellites can be easily recognized and identified. For example, one existing satellite is Galaxy Five which is also know as G5. Therefore the first transponder, or channel, on Galaxy Five is known as G5-1. Similar unique names and abbreviations are used for most commercial TVRO satellites. Naming and abbreviation information is a part of the satellite update information.

Satellite update information can be modulated onto the satellite radio signal in a variety of ways. For continuous transmission of satellite update information, it is useful to modulate an audio sub-carrier with the satellite update information. Alternatively, satellite update information can be modulated onto the video carrier during times when no video information is being transmitted. For example, it is useful to modulate the video carrier during the vertical blanking interval time period. Other schemes can be conceived of for modulating the satellite update information onto the satellite radio signal carrier.

The satellite update information is organized into data records which comprise satellite update information about one particular satellite. One or more records are combined with other information to create a data frame which is modulated directly onto the satellite radio signal carrier. The data frame includes other fields of information which includes a header for determining when a data frame begins and an end of frame field for determining when a data frame ends. In addition, error correction and detection fields and other data fields can be added.

Another aspect of the present invention is the design and structure of a satellite receiver which is suitable for receiving and utilizing satellite update information. Such a satellite receiver is similar to those known in the art to the extent that the present invention receiver must also perform the various functions of prior art receivers. However, the present invention satellite receiver further comprise specialized processing circuitry for detecting and demodulating satellite update information, in addition to a specialized memory structure for storing satellite update information and software for enabling the operation of the various functions required to utilize satellite update information. Among these functions are the ability of the receiver to adjust the antenna system and the receiver to receive satellite update information broadcast at the predetermined time, the ability of the receiver to detect the presence of satellite update information signals, the ability of the receiver to decode satellite update information and store the information in a memory, the ability of the receiver to automatically calculate the antenna actuator pulse count based on the update information angle of longitude, and the ability of the receiver to apply the satellite update information to the existing satellite display and operation functions in a manner that is substantially transparent to the satellite receiver user.

BRIEF DESCRIPTION OF THE DRAWINGS

The features of the present invention which are believed to be novel are set forth with particularity in the appended claims. The invention, together with further objects and advantages thereof, may be best understood by making reference to the following description taken in conjunction with the accompanying drawings, in the several figures of which like reference numerals identify identical elements, and wherein:

DETAILED DESCRIPTION

The preferred embodiment of the present invention is implemented utilizing as much existing infrastructure as is reasonably possible. The benefit of this strategy is to minimize costs. The system includes control, uplink, satellite, downlink, and receiver systems. The uplink, satellite, and downlink equipment are utilized in the form that is presently available in the art. The control and receiver equipment are implemented to accomplish the desired system function in conjunction with the existing infrastructure equipment.

Figure 1:
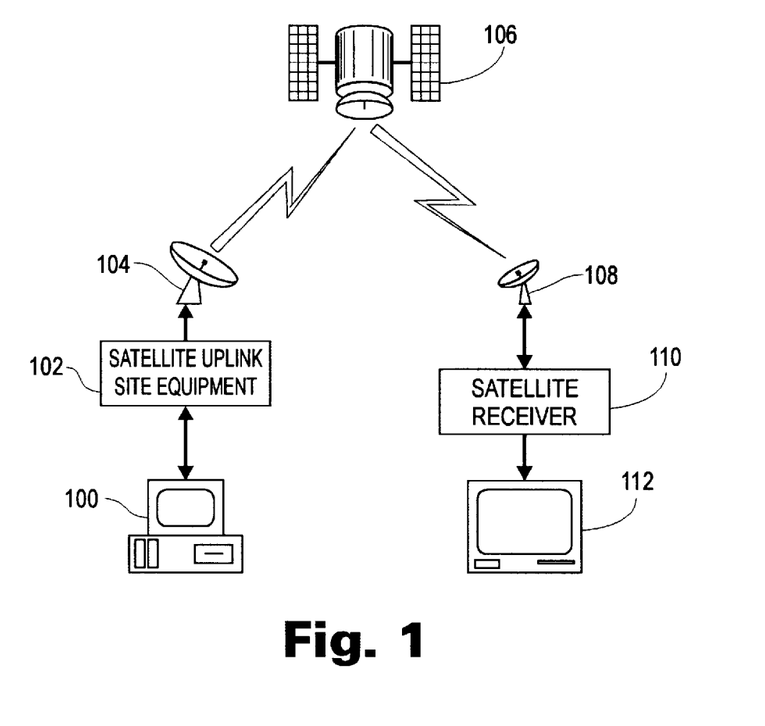
FIG. 1 is a system diagram of the preferred embodiment.

Reference is directed to FIG. 1 which is a system diagram of the preferred embodiment. Control unit 100 is coupled via a communications link to satellite uplink site equipment 102. Control unit 100 may be a personal computer or other similar device. A database program or similar program is executed by the control unit 100. The database program stores satellite update information in a first memory in the control unit 100. As changes occur in the satellite update information they are entered into the control unit 100 via a keyboard or through some other input/output device coupled to the control unit 100. For example, a data file containing update information may be entered into the control unit 100 in the form of a floppy disk, magnetic tape, compact disk read only memory, telecommunications data link, or any other data transfer medium.

The satellite update information stored in a first memory in the control unit 100 is transferred to satellite uplink site equipment 102 from time to time. The time at which a change occurs in the satellite update information is an appropriate time to transfer the update information, so as to keep the satellite update information in the satellite uplink site equipment 102 as current as possible. The communications link between the control unit 100 and satellite uplink site equipment 102 may comprise a pair of modems and a dial-up telephone line. The control unit 100 may execute a computer communications program suitable for the type of modem used.

The satellite uplink site equipment 102 encodes the satellite update information onto a satellite signal which is coupled to a satellite uplink antenna 104. Uplink antenna 104 transmits the satellite signal to a satellite 106 which is stationed in geosynchronous orbit above earth. Satellite 106 receives the satellite signal comprising the encoded satellite update information and re-transmits the signal back to earth.

Presently, there are approximately thirty-two geosynchronous satellites in orbit which operate in the C-band and/or Ku-band which would be suitable for reception and re-transmission of the satellite signals that are encoded with the satellite update information. Separate satellite signals may be used for each of the C-band and Ku-band. Some of the satellites presently in orbit operate in both the C-band and Ku-band. However, it is preferred to store update information about each of the operating bands of such satellites as an individual satellite.

Within either of the C-band or Ku-band it is useful to transmit satellite signals encoded with the satellite update information to more than one satellite. This strategy provides for redundancy and more complete geographic coverage.

At the time of this writing, the following C-band geosynchronous satellites are in operation:

| LON. | ABVR. | BAND | POL. | NAME |
|------|-------|------|------|------|
| W069 | S2 | C | INV | SPACENET-2 |
| W072 | F2 | C | NOR | SATCOM-F2R |
| W074 | G2 | C | INV | GALAXY-2R |
| W087 | S3 | C | INV | SPACENET-3 |
| W089 | T2 | C | NOR | TELSTAR-402 |
| W091 | G7 | C | INV | GALAXY-7 |
| W093.5 | G3 | C | INV | GALAXY-3 |
| W097 | T1 | C | NOR | TELSTAR-401 |
| W099 | G4 | C | INV | GALAXY-4 |
| W101 | S4 | C | NOR | SPACENET-4 |
| W107.3 | E2 | C | INV | ANIK-E2 |
| W109.2 | M1 | C | NOR | SOLIDARIDAD-1 |
| W111.1 | E1 | C | INV | ANIK-E1 |
| W116.8 | M2 | C | INV | MORELS-2 |
| W123 | T3 | C | NOR | TELSTAR-303 |
| W125 | G5 | C | INV | GALAXY-5 |
| W128 | A1 | C | INV | ASC-1 |
| W131 | F3 | C | NOR | SATCOM-C3 |
| W133 | G1 | C | INV | GALAXY-1R |
| W135 | F4 | C | NOR | SATCOM-C4 |
| W137 | F1 | C | INV | SATCOM-C1 |
| W139 | C5 | C | NOR | AURORA-2 |

At the time of this writing, the following Ku-band geosynchronous satellites are in operation:

| LON. | ABVR. | BAND | NAME |
|------|-------|------|------|
| W069 | S2 | Ku | SPACENET-2 |
| W072 | B3 | Ku | SBS-3 |
| W074 | B2 | Ku | SBS-2 |
| W081 | K2 | Ku | SATCOM-K2 |
| W085 | K1 | Ku | SATCOM-K1 |
| W087 | S3 | Ku | SPACENET-3 |
| W089 | T2 | Ku | TELSTAR-402 |
| W091 | G7 | Ku | GALAXY-7 |
| W093 | R3 | Ku | GSTAR-3 |
| W095 | B6 | Ku | SBS-6 |
| W097 | T1 | Ku | TELSTAR-401 |
| W099 | G4 | Ku | GALAXY-401 |
| W101 | S4 | Ku | SPACENET-4 |
| W103 | R1 | Ku | GSTAR-1 |
| W105 | R4 | Ku | GSTAR-4 |
| W107.3 | E2 | Ku | ANIK-E2 |
| 113 | M1 | Ku | SOLIDARIDAD-1 |
| W111.1 | E1 | Ku | ANIK-E1 |
| W113 | M2 | Ku | MORELOS-2 |
| W123 | B5 | Ku | SBS-5 |

-continued

| LON. | ABVR. | BAND | NAME |
|------|-------|------|------|
| W125 | R2 | Ku | GSTAR-2 |
| W128 | A1 | Ku | ASC-1 |

Referring again to FIG. 1, satellite 106 retransmits the satellite signal comprising encoded satellite update information. The retransmitted satellite signal is received by downlink antenna system 108. A plurality of downlink antennas can simultaneously receive the satellite signal retransmitted from satellite 106.

The satellite signal received by downlink antenna 108 is down-converted in frequency by a low-noise block down-converter, (LNB), which is an integral part of downlink antenna system 108. The down-converted satellite signal is coupled to satellite receiver 110 through an appropriate cable.

Satellite receiver 110 further down-converts and detects the received satellite signal and decodes the satellite update information contained therein. The decoded satellite update information is stored in a memory in satellite receiver 110. The information is used by receiver 110 to position antenna system 108 and adjust other operating parameters which will by described hereinafter. Finally, receiver 110 is coupled to a television receiver or monitor which displays satellite program information and also displays satellite update information in a graphical of textual format for review by system users.

Satellite update information can be broadcast continually so that whenever downlink antenna system 108 is directed to a satellite 106 that transmits satellite update information, the information will be received so that the memory in the receiver 110 coupled to downlink antenna system 108 can be updated by the continually transmitted satellite update information. Alternatively, the satellite update information may be broadcast from time to time, and the satellite receiver programmed to direct its antenna to a particular satellite that transmits satellite update information at a time in synchronous with the time that the satellite is to transmit satellite update information.

Figure 2:
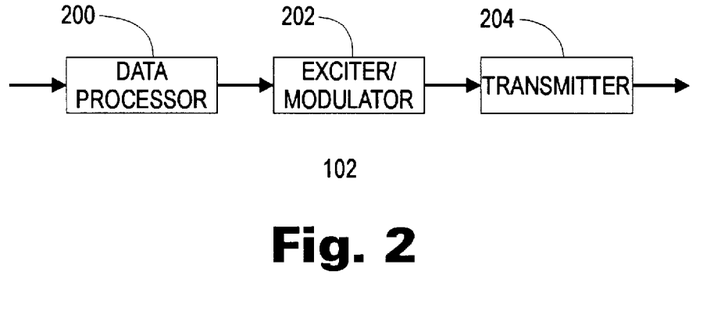
FIG. 2 is a functional block diagram of the satellite uplink site in the preferred embodiment.

Reference is directed to FIG. 2 which is a block diagram of the satellite uplink site equipment 102. Data is received by data processor 200 from control unit 100. Data processor 200 formats the data into one or more data packets which are suitable for modulation onto a satellite uplink signal by exciter/modulator 202. The data packets are coupled to exciter/modulator 202 wherein the data is modulated unto a satellite uplink signal for transmission by transmitter 204. The transmitter 204 increases the power of the satellite signal coupled from exciter/modulator 202. The output of transmitter 204 is coupled to uplink antenna 104 for transmission to satellite 106.

The data processor 200 may be a personal computer or similar device which is suitable for communications via modem, or other link, with control unit 100, (FIG. 1). Data processor 200 formats data packets, which are described in detail hereinafter, and couples these signals to exciter/modulator 202. The physical interface may be via serial communications in accordance with EIA recommended standard RS-232-C, or similar communications protocol. Exciter/modulator 202 is of the type which allows modulation of the video vertical blanking interval, (VBI), time period. This is the time period in each video frame during which the electron beam in the cathode ray tube of the receiving monitor is deflected vertically to begin the tracing of each new image frame. The video signal information is blanked during this period, and as such, data can be modulated onto the video carrier during this time period. This technique is well know in the art and has been in use for several years.

The method or transmission of the satellite update data is not critical to the present invention. It is also known to use a signal sub-carrier within the satellite transponder bandwidth, or alternatively to use SCPC, (Single Channel Per Carrier), for the purpose of transponding data through a satellite. Certainly, other means of encoding data into the transponder bandwidth of a satellite are foreseeable. In any case, the data processor and the satellite receiver must be coordinated such that each encodes and decodes and functions in accordance with a coordinated time table such that the satellite update information is transferred between the units.

In general, the uplink portion of the preferred embodiment is operated by a service provider who maintains a database of satellite update information. As changes occur, the database is updated, and the satellite update information is distributed to a plurality of satellite TVRO receivers which automatically adapt their respective antenna systems 108 and receivers 110 so that the end users of TVRO satellite receivers are not bothered with such activity and so that all available programming is readily accessible to them.

Figure 3:
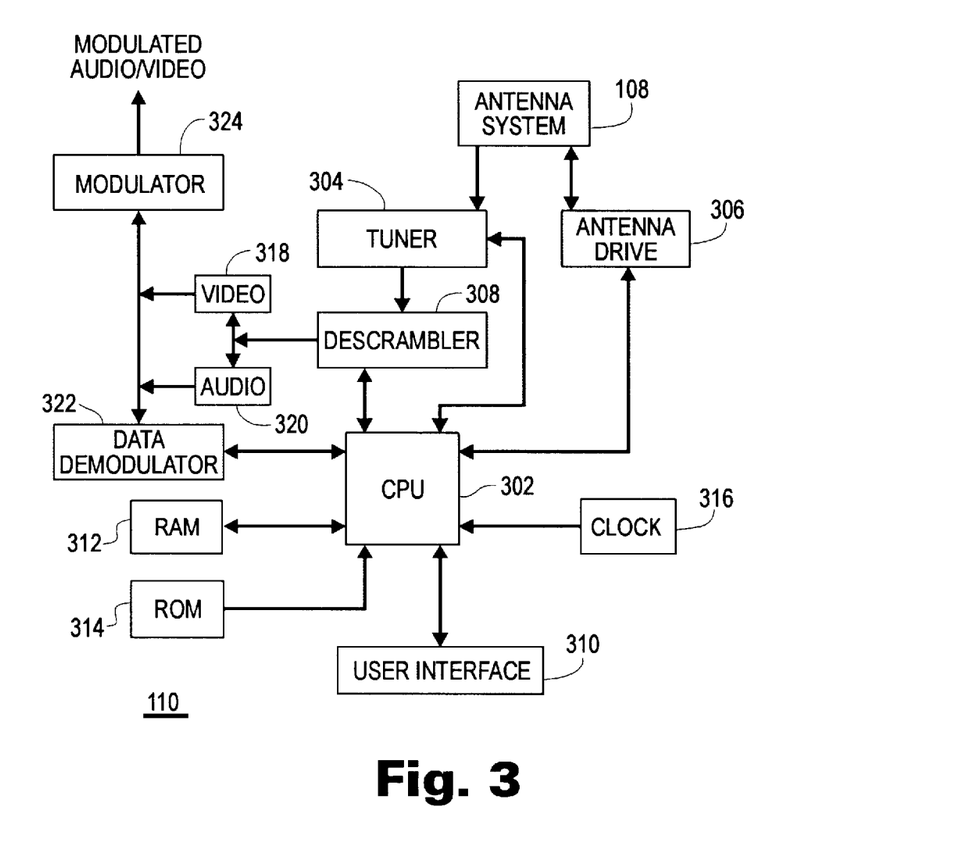
FIG. 3 is a functional block diagram of the satellite receiver in the preferred embodiment.

The satellite receiver 110 is shown in FIG. 3, in functional block diagram form. The satellite receiver is controlled by a central processing unit, (CPU), 302 that is coupled to a tuner 304 and antenna drive 306. The tuner 304 and antenna drive 306 connect to antenna system 108 though a suitable cable. By using this arrangement, the CPU 302 controls the antenna system 108 with respect to the direction the antenna is pointed and the polarization of the received signal.

The CPU 302 is coupled to a descrambler 308 which accepts received signals from tuner 304 and descrambles the signals for subsequent processing, which will be more fully described hereinafter.

The satellite receiver 110 includes a user interface 310 which is coupled to CPU 302. The user interface 310 may comprise a display having numeric digits, alphanumeric digits, icons, and/or indicators to inform the user as to the functional status of the satellite receiver 110. Additionally, the user interface 310 may comprise buttons, knobs, selectors and the like for inputting commands and operational parameters to the satellite receiver 110. The inputting items of the user interface 310 may be interfaced to the CPU 302 via remote control, such as via infrared or radio linked remote control.

The CPU 302 is also interfaced to RAM 312, ROM 314, and a system clock 316. The ROM 314 is used for storage of software and permanent variables. The RAM 312 is used for storage of temporary and non-permanent variables. Satellite update information is stored in the RAM 312 in the preferred embodiment, or alternatively may be stored in a EEPROM or other non-volatile storage media. If RAM is used, it is recommended that a battery back-up scheme be employed to prevent loss of data during power outages.

The clock 316 provides a real-time reference to the CPU 302 for use in synchronizing the reception of satellite update information, and for other time related functions of the satellite receiver 110.

In operation, satellite signals comprising satellite update information are received by the antenna system 108. The received signals are coupled to tuner 304 which tunes specific frequencies according to commands received from CPU 302. The tuner 304 demodulates the received signals and the demodulated signals are coupled to descrambler 308. The descrambler used depends on the type of signal encryption used at the uplink site. Industry standard encryption and descrambling schemes are well known in the art and have no effect on the scope of the present invention.

Descrambler 308 converts the received signal into a descrambled form which is suitable for further audio, video, and/or data processing. Video signal information is processed by video circuitry 318 into base-band video signals. Audio signal information is processed by audio processing circuitry 320 into base-band audio signals. Both the base-band audio and video signals are coupled to modulator 324 where they are modulated onto a television radio frequency carrier and are subsequently coupled to a television receiver, such as a television set tuned to channel three or four.

In the preferred embodiment, satellite update information in the form of digital data is descrambled, as a part of the video signal information during the vertical blanking interval, by descrambler 308. Of course, the scrambling/descrambling function is optional and is not required in the present invention. The satellite update information is further processed by video circuitry 318 into baseband video signals having data modulated onto the video signal carrier during the vertical blanking interval. The satellite update information is therefore available everywhere the video baseband signal is present in the satellite receiver 110.

In another embodiment, where the satellite update information is modulated onto an audio sub-carrier, then the satellite update information is processed by the audio circuitry 320 and is present everywhere in the satellite receiver 110 that the base band audio signal is present. In either case, the satellite update information in the form of modulated data is coupled to data demodulator 322.

Data demodulator 322 operates in accordance with the modulation scheme employed at the uplink site. It is not critical what scheme is used. The demodulated satellite update information, in the form of digital data is coupled to CPU 302 for processing and interpretation.

Figure 4A:
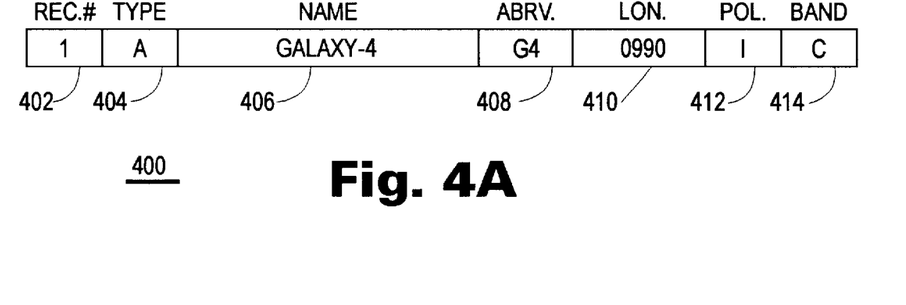
FIG. 4A, 4B, and 4C are data diagrams of the satellite update information in the preferred embodiment.
Figure 4B:
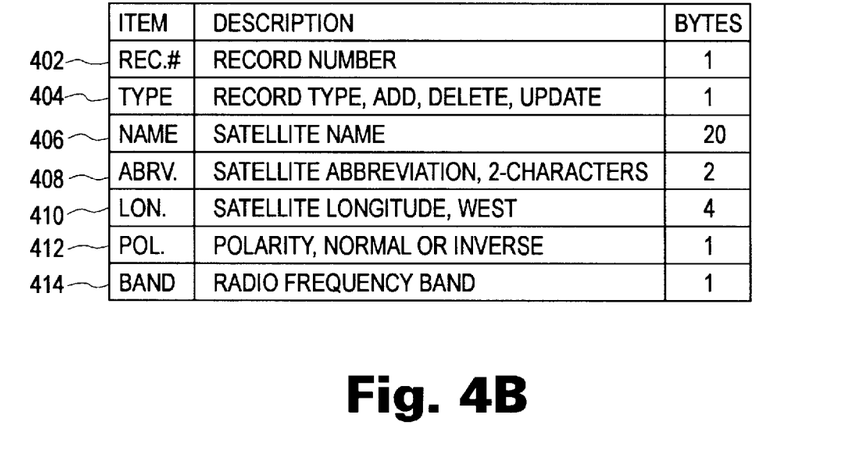
Figure 4C:
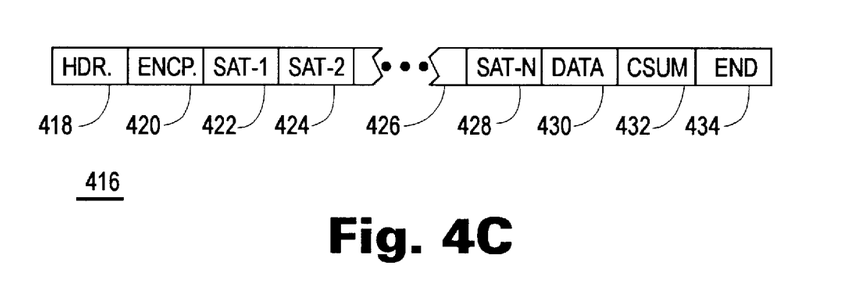

Reference is directed to FIGS. 4A, 4B, and 4C which depict the data format of the satellite update information. FIG. 4A shows a single record 400 of satellite update information which is applicable to a single satellite.

The satellite update information record 400 comprises a plurality of data fields which include a record number [REC.#] 402, a type identifier [TYPE] 404, a satellite name [NAME] 406, a satellite abbreviation [ABRV.] 408, a satellite longitude filed [LON.] 410, a satellite polarity field [POL.] 412, and a satellite band field [BAND] 414. FIG. 4B tabulates the data field items together with a brief description and the suggested size of the data field in bytes.

The description and purpose of each data field, in accordance with FIG. 4B, is described below:

| ITEM  | DESCRIPTION             | SIZE      | PURPOSE                                              |
|-------|-------------------------|-----------|------------------------------------------------------|
| REC.# | RECORD NUMBER           | 1 BYTE    | Uniquely identifies each record in a frame.          |
| TYPE  | RECORD TYPE             | 1 BYTE    | A = Add as new record, D = Delete record, U = Update existing record. |
| NAME  | SATELLITE NAME          | 20 BYTES  | Common name for satellite.                           |
| ABVR. | SATELLITE ABBREVIATION  | 2 BYTES   | Common 2-character abbreviation for satellite.       |

-continued

| ITEM | DESCRIPTION | SIZE | PURPOSE |
|---|---|---|---|
| LON. | SATELLITE LONGITUDE | 4 BYTES | Satellite position indicated as degree west longitude. 0990 equals 99.0 degrees west longitude, etc. |
| POL. | SATELLITE POLARITY | 1 BYTE | N = Normal polarity, I = Inverse polarity. |
| BAND | SATELLITE FREQUENCY BAND | 1 BYTE | C = C-band of operation, K = K-band of operation. |

The forgoing data structure provides satellite update information suitable for adding satellites, deleting satellites, and updating satellite information stored in a memory in a satellite receiver. For each satellite, the necessary information is provided so that the satellite receiver will have sufficient data stored in its memory to allow it to direct its antenna system to the satellite and to configure its receiver and receiver related circuitry to properly receive the desired satellite signal. For example, the receiver will have the correct satellite position in degrees west longitude so that it can calculate the antenna position actuator position and move the antenna accordingly, the receiver will have the correct band of operation and receiver polarity to allow it to configure the proper frequency and polarity of operation. Further, the receiver will have the satellite name and abbreviation so that it can be properly displayed to the end user and for verification of information.

Reference is directed to FIG. 4C which shows a satellite data frame 416. In the preferred embodiment, a satellite update information data frame is employed so that a single transmission of data can update all of the satellites in a single transmission. Each data frame comprises a plurality of satellite update information fields, in addition to other information which will be described hereinafter.

A satellite data frame 416 comprises a header field [HDR.] 418 which indicates the beginning of a data frame. Optionally, and encryption key [ENCP.] 420 can be added if the satellite update information is to be encrypted. Alternatively, if encryption is not required, this field can be omitted or set to a non-encryption value. Next, the data frame comprises a plurality of satellite update information data records 422, 424, 426, and 428. In FIG. 4C, these are identified a SAT-1, SAT-2, . . . , SAT-N where the 1, 2, and N indicate the record number 402 for each data record. The number of data records is necessarily variable because the number of satellite identified in the preferred embodiment are variable.

The satellite update information frame further comprises a data field [DATA] 430 which is reserved for special data transmissions between the uplink site and the satellite receivers. A error detection and/or correction field [CSUM] 432 is provided to determine if an error has occurred in the transmission. In the preferred embodiment, an odd/even check sum is used, and, if an error is detected the entire data frame is ignored and the update will not occur until a new, error-free, satellite update data frame is received. Alternatively, a more comprehensive cyclical redundancy check could be employed and/or forward error correction data could be sent to allow the satellite receiver to correct errors in the received data. However, since the signal environment will generally be of good quality, these advanced techniques are not included in the preferred embodiment. Finally, the satellite update data frame comprises an end [END] 434 field to indicate to the receiver that the end of the data frame has occurred. Upon receipt of the end data field, the satellite receiver processes that data and alters the contents of its memory accordingly.

The satellite receiver 110 comprises a memory 312 for storing satellite information which is updated from time to time by satellite update information. Upon the receipt of satellite update information, the CPU 302 compares the contents of a satellite information table in memory with the contents of the various satellite update data records received in a data frame. Additions, updates, and deletions to the memory table are made in accordance with the contents of the type field [TYPE] 404, for each record. The memory table in the receiver is structured essentially the same as the table shown in FIG. 4B. Alterations are written to the receiver memory 312 by the CPU 302.

In addition to the information provided in the satellite update information the receiver CPU must calculate the necessary information to position the antenna system 108 in the proper direction to received a desired signal.

Figure 5:
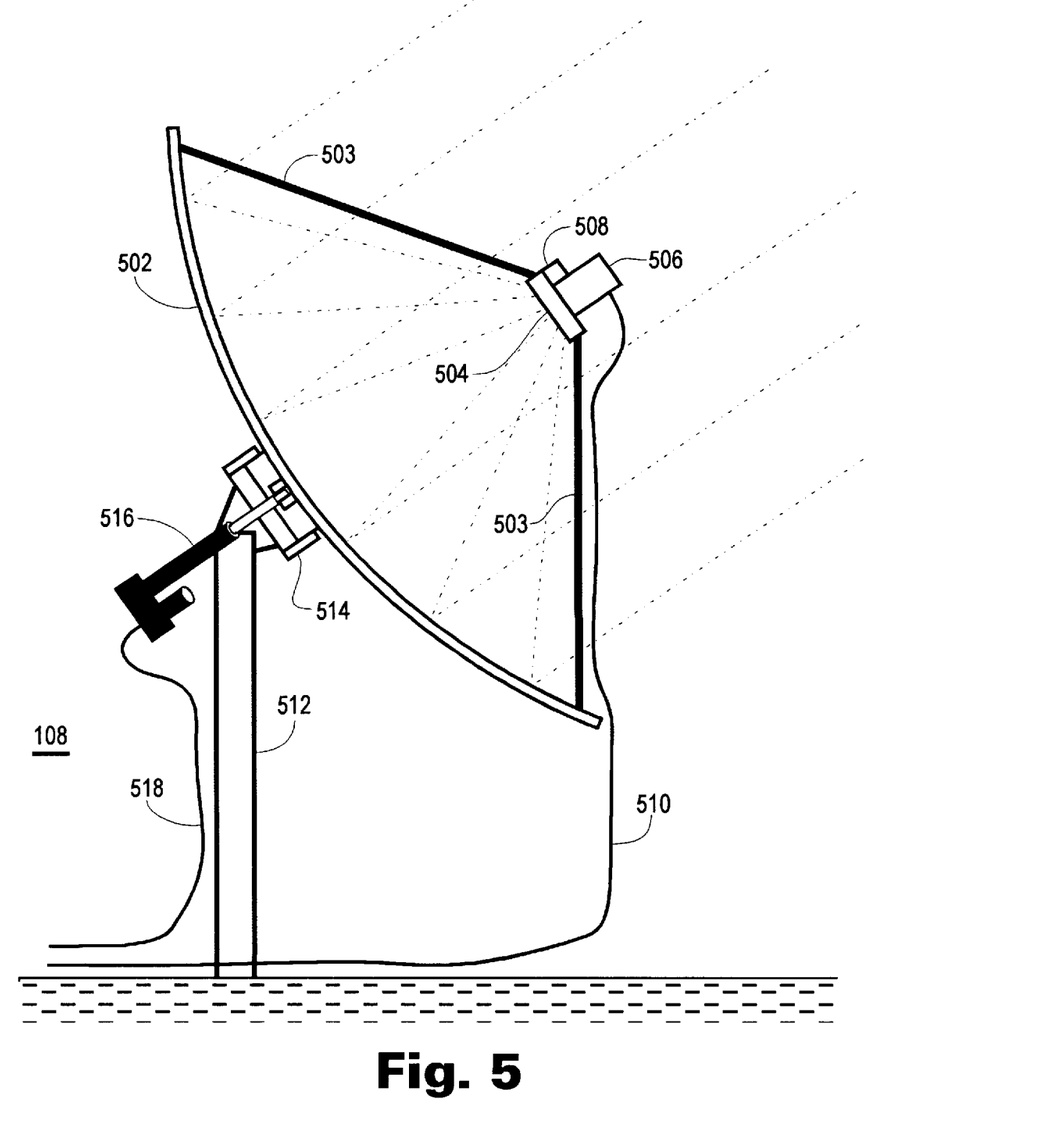
FIG. 5 is a drawing of the satellite receiver antenna in the preferred embodiment.

Reference is directed to FIG. 5 which shows a satellite receiver antenna 108 in the preferred embodiment. The antenna comprises a parabolic reflecting dish 502 which is attached to a feed horn 504 by mounting struts 503. The feed horn 504 is positioned at the focal point of the dish 502 so that radio energy that propagates on a path that is parallel to the longitudinal axis of the dish 502 is focused and coupled to feed horn 504. Feed horn 504 is coupled to low-noise block down converter, LNB, 506. The LNB receives radio energy from feed horn 504 and down converts it in frequency and subsequently couples it to the satellite receiver 110 via cable assembly 510. LNB 506 further comprises a polarizer 508 which is a motorized assembly that adjusts the electric field polarity of the LNB between a horizontal polarization and a vertical polarization. Satellite transponders transmit signals in one of these two polarities. The ability of the LNB to adjust the polarity is important to receiving the strongest possible signal and also for isolating interference from unwanted signals that are adjacent to the desired signal. Polarizer 508 is under control of the satellite receiver 110 and is also coupled to the receiver via cable assembly 510.

Dish 502 is coupled to stanchion 512 via a polar mount 514. An actuator arm is pivotally mounted to stanchion 512 and dish 502 such that extension and retraction of actuator 516 causes dish 502 to rotate about polar mount 514 and track an arc across angles of longitude in which a plurality of geosynchronous satellites are located. The degree of extension and retraction of actuator 516 is controlled by receiver 110 wherein CPU 302 directs antenna drive 306 to transmit electrical power to actuator 516 thereby increasing or decreasing the degree of extension of actuator 516.

In order for receiver 110 to determine the required number of pulses to achieve a given amount of extension, it must calculate the number of pulses required to achieve a desired degree of rotation of the polar mount 514 needed in order to point the dish 502 to a desired angle of longitude.

At the time an antenna system is initially installed, an installation professional typically aligns the antenna and actuator to two or more satellites in orbit at the time of installation. In doing so, the receiver is oriented as to the pulse counts required for each of these at least two satellites. Typically there are many more than two satellites aligned at the time of installation. Therefore, for the preferred embodiment of the present invention, changes in satellite update information are typically incremental, including the changes in satellite longitude. Each incremental changes is adapted to by recalculating the pulse count for the new angle of longitude by referencing the pulse counts of existing satellites with known angles of longitude and pulse counts. Further, since satellite receivers typically can make minor adjustments to the pointing angle in order to optimize signal strength, the precision of the pulse count calculation need only be reasonably close. That is to say, close enough so that some amount of the desired signal is received. Once this degree of pointing accuracy is achieved, then the satellite receiver is capable of automatically fine tuning the pointing angle so as to maximize the strength of the received signal.

The calculation of a new pulse count, based on the existing pulse counts for two existing satellites referenced in the west to east direction is achieved as follows:

$$P_N = P_C - (|L_C - L_N| * |P_C - P_R|/|L_C - L_R|)$$

Wherein:

$P_N$=Pulse count to new satellite based on position of existing west satellite.

$P_C$=Current pulse count of the closest satellite $P_R$=Current pulse count of the next reference satellite $L_N$=Angle of longitude of new satellite $L_C$=Angle of longitude of the closest satellite $L_R$=Angle of longitude of the next reference satellite The other update information does not require any calculations, as such, prior to being ready for utilization in the receiver for reception of signals and display of information to the end user.

Figure 6:
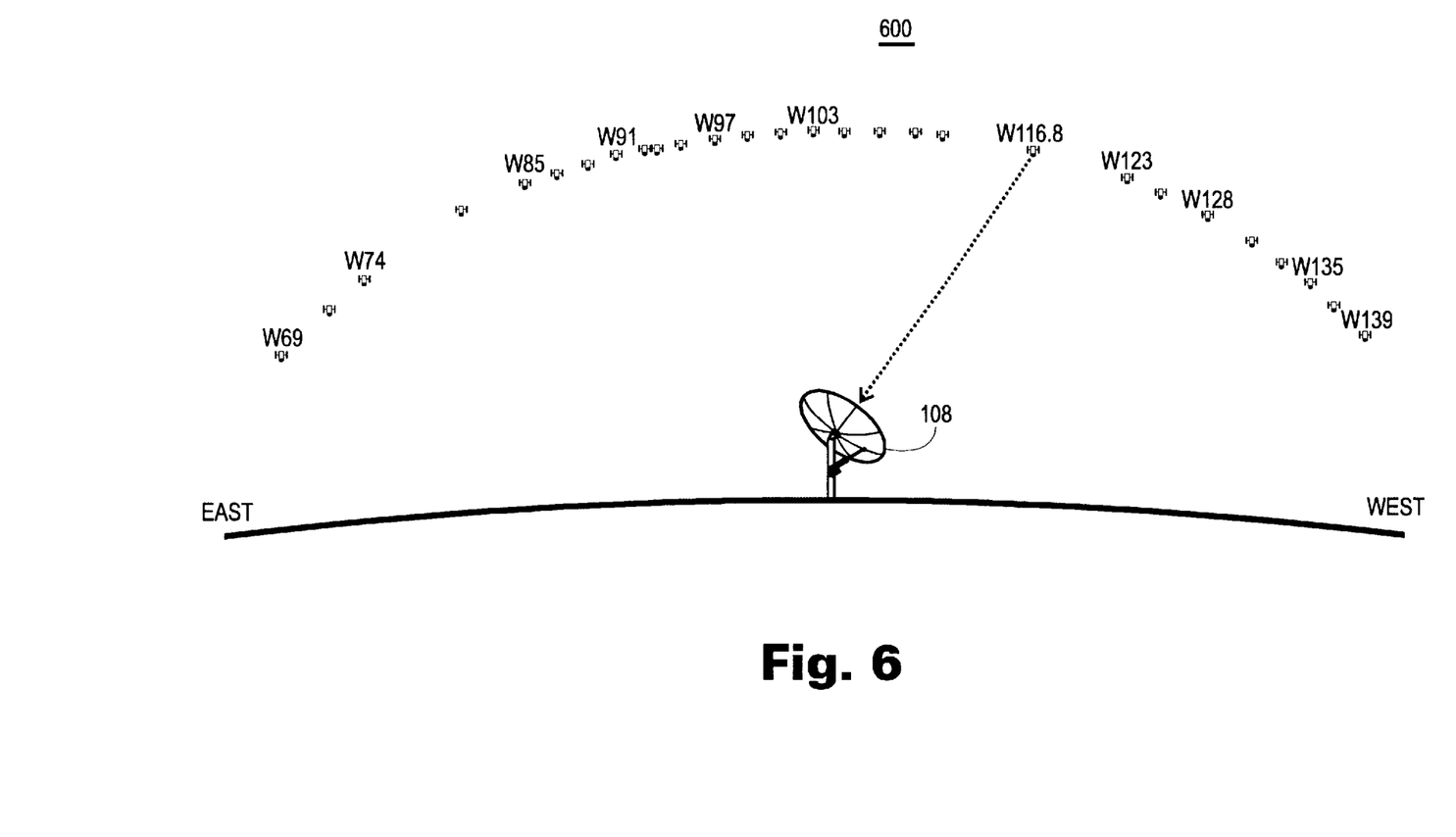
FIG. 6 is a view of the satellite receiver antenna in relation to a plurality of geosynchronous satellites.

Reference is directed to FIG. 6 which shows the orientation of various geosynchronous satellites 600 in an arc which trackable by antenna 108.

Figure 7:
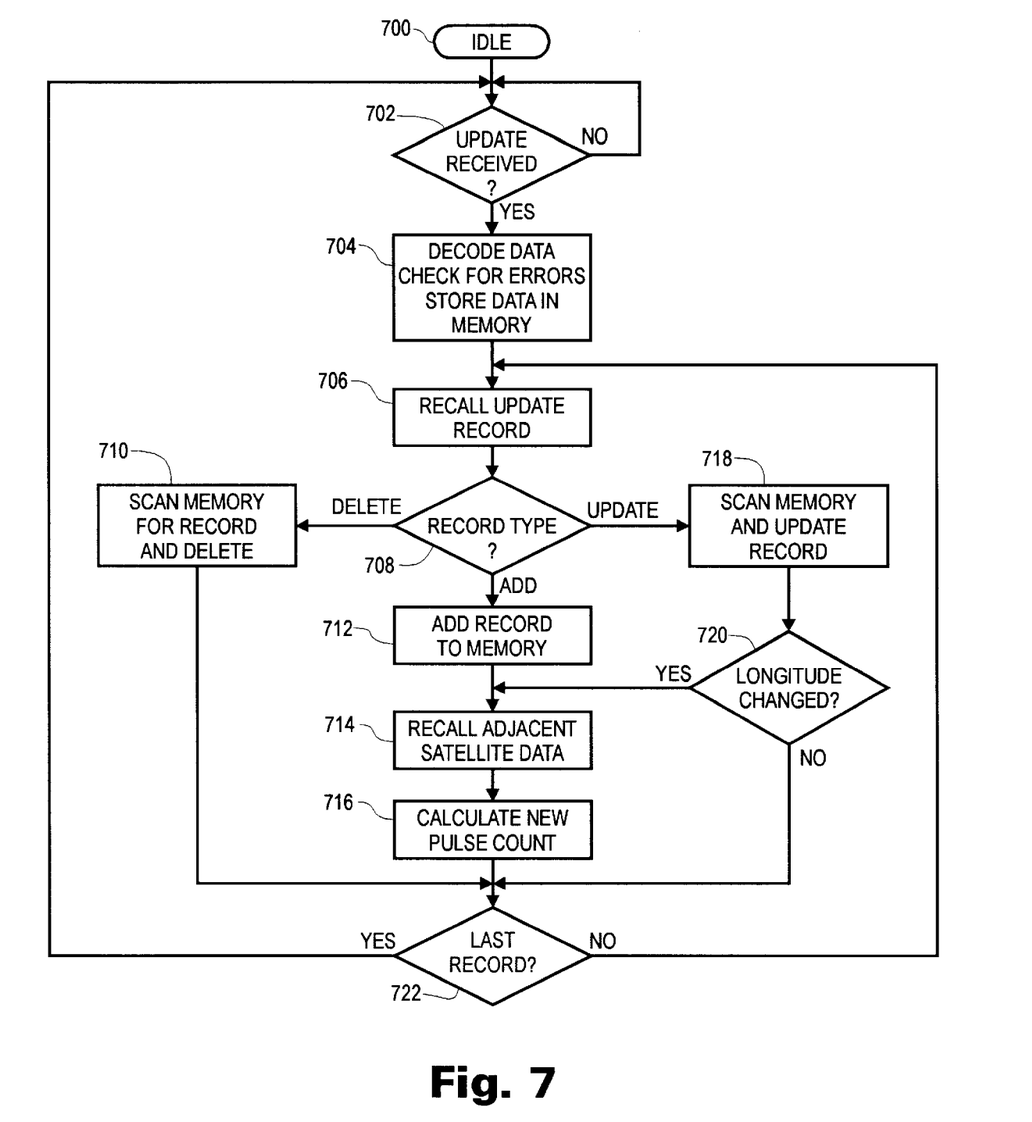
FIG. 7 is a software flow diagram of the satellite update information reception routine in the preferred embodiment.

The function of receiving is depicted in FIG. 7 which is a software flow diagram of the satellite update information receive routine in the preferred embodiment. This routine is enabled through the use of software that is stored in ROM 314 and is executed by CPU 302. The purpose of this routine is to wait for a satellite update message to be received and store the data in a second memory in the receiver 110. Subsequently, the data is processed during which the update information is used to modify a satellite data table in a third memory in the satellite receiver 110. The third memory is referenced during conventional operation of the satellite receiver.

The satellite update information routine begins in the idle state at step 700 where the CPU continually checks for the receipt of a satellite update information data frame at step 702. If no data frame is received at the time the CPU makes this check, the CPU returns to check again. When an update message is received, at step 702, then the CPU proceeds to step 704 where the satellite update information data frame is decoded and the CPU checks for any error by solving the error correction formula. Data which does not have any errors therein are stored to a second memory during step 704.

Having stored all the error free satellite update information data into the second memory, the CPU proceeds to step 706 where a first of the satellite update information data record is recalled from the second memory. At step 708, the record type filed is checked to determine in the present record is for the deletion of a record, the addition of a record, or the update of an existing record. If a deletion record is found at step 708, the CPU proceeds to step 710 where the third memory is scanned to find a matching record in the satellite information database. The record is deleted and the CPU proceeds to step 722, discussed hereinafter.

Alternatively, at step 708, if an additional record type is found, the CPU proceeds to step 712 where the record is added to the satellite information database in the third memory. Returning to step 708, if an update record type is found, then the CPU proceeds to step 718 where the CPU scans the satellite information database to find the corresponding satellite record and updates the contents of the record to match the satellite update information. Next, at step 720, the CPU checks to see if the longitude of the update record has changed. If the longitude has not changed, then the CPU proceeds to step 722, which will be described hereinafter. Alternatively, if the longitude has changed, then the CPU proceeds to step 714 wherein the CPU recalls the longitude and pulse count information for the two satellites adjacent to the update satellite. Likewise, if the software flow to step 714 came from a newly added record, from step 712, the CPU also proceeds to step 714.

The purpose of calling the adjacent satellite longitude and actuator pulse count data is to allow the CPU to calculate the pulse count for the new or update record at step 716. This calculation was described herein before. The pulse count is stored in the satellite information database for use by the CPU in positioning the antenna during normal operation of the receiver.

Finally, at step 722, the CPU checks to see if the present record is the last of the satellite update records. If it is not, the CPU returns to step 706 and recalls the next available satellite update information record and returns through the aforementioned routine. Alternatively, if the present record is the last record, at step 722, then the CPU returns to the idle condition at steps 700 and 702 to await the next receipt of satellite update information.

While the foregoing specification and drawings enable those skilled in this and related arts to practice the present invention in accordance with the preferred embodiment, the claimed invention encompasses a broader scope. Further modifications and improvements may occur which will make obvious manifold variants of the present invention. The claims appended hereunto are intended to read upon all such variants.

What is claimed is:

1. A method of utilizing satellite update information in a satellite broadcast system comprising an uplink site, a satellite, and at least a first downlink site, and wherein said uplink site comprises a controller for modulating a first satellite radio signal and a satellite transmitter for transmitting said first satellite radio signal, and said at least a first downlink site comprises an antenna and a satellite receiver, and wherein said antenna comprises an actuator for positioning said antenna according to a pulse count accumulated by said satellite receiver, the method comprising the steps of:

accumulating said satellite update information, having data related to a plurality of satellites, at said uplink site;

coupling said satellite update information to said controller for modulating said satellite update information onto a first satellite radio signal;

transmitting said first satellite radio signal to said satellite, wherein said satellite re-broadcasts said satellite update information back to earth as modulated information on a second satellite radio signal;

receiving said second satellite radio signal by said at least a first downlink site;

demodulating said satellite update information by said satellite receiver in said at least a first downlink site;

storing said satellite update information in a second memory in said satellite receiver;

recalling a first pulse count and a first satellite position for a first satellite from a satellite database stored in a third memory in said satellite receiver;

recalling a second pulse count and a second satellite position for a second satellite from said satellite database stored in said third memory in said satellite receiver;

recalling a satellite position field for at least a third satellite stored in said second memory as satellite update information;

calculating a third pulse count for said at least a third satellite based on said first pulse count, said second pulse count, said first satellite position, said second satellite position, and said third satellite position field;

automatically storing at least a portion of said satellite update information for said at least a third satellite in said third memory together with said third pulse count, thereby updating said satellite database with said at least a third satellite;

recalling said third pulse count from said satellite database by said satellite receiver, and actuating said actuator by said satellite receiver and accumulating a pulse count by said satellite receiver according to said third pulse count for subsequent reception of satellite radio signals in accordance with said satellite update information.

* * * * *